United States Patent [19]

Laurent et al.

[11] Patent Number: 5,453,140
[45] Date of Patent: Sep. 26, 1995

[54] METHOD FOR THE MANUFACTURE OF A TIRE IN WHICH THE CARCASS REINFORCEMENT IS FORMED ON A CORE FROM A SINGLE THREAD

[75] Inventors: Daniel Laurent, Meylan; Jean-Claude Mayet, Clermont-Ferrand, both of France

[73] Assignee: Sedepro, Paris, France

[21] Appl. No.: 264,426

[22] Filed: Jun. 23, 1994

Related U.S. Application Data

[63] Continuation of Ser. No. 87,211, Jul. 2, 1993, abandoned.

[30] Foreign Application Priority Data

Jul. 21, 1992 [FR] France ............................ 92 09256

[51] Int. Cl.⁶ ............................................. B29D 30/16
[52] U.S. Cl. .................... 156/117; 156/133; 156/173; 156/175; 156/397
[58] Field of Search .................... 156/117, 121, 156/130.7, 133, 135, 123, 397, 398, 405.1, 408, 173, 175; 152/548, 562, 560

[56] References Cited

U.S. PATENT DOCUMENTS

| | | | |
|---|---|---|---|
| 990,392 | 4/1911 | Rowley | 156/397 |
| 1,149,364 | 8/1915 | Griffith | 156/117 |
| 1,259,997 | 3/1918 | Kline | 156/397 |
| 1,328,006 | 1/1920 | McLeod | 156/117 |
| 3,356,553 | 12/1967 | Frazier | 156/397 |
| 3,616,001 | 10/1971 | Addis . | |
| 4,277,295 | 7/1981 | Schmidt et al. | 156/117 |
| 4,600,456 | 7/1986 | Oswald . | |
| 4,775,433 | 4/1988 | Ishii . | |
| 4,830,781 | 6/1989 | Oswald . | |

FOREIGN PATENT DOCUMENTS

| | | |
|---|---|---|
| 390762 | 6/1990 | Austria . |
| 2583399 | 12/1986 | France . |

Primary Examiner—Geoffrey L. Knable
Attorney, Agent, or Firm—Brumbaugh, Graves, Donohue & Raymond

[57] ABSTRACT

A thread, intended to form a carcass reinforcement, is wound in contiguous hoops on a rigid core through an eyelet fastened on a chain mounted on pulleys arranged around the core. The eyelet carries out a reciprocating movement around the core so as to progressively and contiguously lay a hoop upon each forward movement and a hoop upon each return movement.

8 Claims, 13 Drawing Sheets

METHOD FOR THE MANUFACTURE OF A TIRE IN WHICH THE CARCASS REINFORCEMENT IS FORMED ON A CORE FROM A SINGLE THREAD

This application is a continuation of application Ser. No. 08/087,211, filed on Jul. 2, 1993, now abandoned.

BACKGROUND OF THE INVENTION

The present invention relates to the manufacture of tires, and more particularly, to the laying of threads to constitute a reinforcement of the tire, such as, for instance, a carcass.

In this field of art, methods and machines are already known which make it possible to include the manufacture of the tire reinforcements in the assembling of the components of tire. This means that, rather than having recourse to semifinished products, such as reinforcement plies, a reinforcement is made or reinforcements are made in situ from a single spool of thread at the time that the tire is manufactured. The solution described in U.S. Pat. No. 4,795,523 is, for instance, known. Although that solution constitutes a considerable advance over the conventional techniques employing reinforcement plies, it has the drawback that a machine designed to carry out that solution can only produce tires which always have the same number of threads in the reinforcement thus produced, for instance, always the same number of radial hoops in a radial carcass.

The solution described in U.S. Pat. No. 4,952,259 is also known. That proposal, which is based on projecting a thread in the manner of a whiplash, makes it possible to sweep across the ordinary angles of so-called crown plies. It also makes it possible to produce carcass reinforcements in which the thread extends from one bead to the other of the tire. However, in that device it is difficult to lay the threads at the small angles which are used at times in certain crown reinforcements. The angles are measured with respect to a reference defined by a plane perpendicular to the axis of rotation of the tire in accordance with the well-established convention.

SUMMARY OF THE INVENTION

The object of the present invention is to propose a method of manufacture which makes it possible to produce from a single thread all carcass reinforcements as well as most crown reinforcements, that is to say the reinforcements found below the tread in which the angle which the threads of these reinforcements form with respect to the plane perpendicular to the axis of rotation of the tire is substantially different from zero degree.

Another object of the invention is to propose a method which makes it possible to produce a reinforcement with whatever number of threads it is desired to provide in the reinforcement.

Another object of the invention is for the apparatus which carries out the method to be mechanically as simple and light as possible, and that said apparatus requires at most only simple adjustments to be made in order to adapt it to all variants of tire reinforcements to be produced, covering the widest range of tires possible.

According to the invention, the method of manufacturing a rubber tire which consists in applying the different components at the place required by the architecture of the tire on a support the surface of which has the shape of the inner surface of the tire, in which the reinforcement thread applied on the support is held on the support by adherence, is characterized by the fact that the reinforcement thread is laid by displacing a guide means in the space dominating the trace which the thread will make after it has been wound on the support, said guide means being in guiding relationship with slippage on the thread, and by the fact that this guide means is imparted a movement which permits the winding of the thread around the support from one side of the support to the other and then winding on return, and continuation of the movement with, from one winding to the next, relative circumferential displacement between support and guide means by an amount corresponding to the laying pitch of the thread on the support, so that the thread forms adjacent hoops on the support.

The basic cycle of the method of the invention therefore comprises the following steps:

laying the thread by applying it by adherence to the support from a starting point corresponding to the edge of a hoop, displacing the said guide means in guiding relationship with slippage on the thread, over the support along an arcuate trajectory from the starting point to a point of arrival corresponding to the other edge of the same hoop, applying the thread, by adherence, on the support at said arrival point, and repeating the preceding operations alternately from left to right and then from right to left over the support, displacing the support with respect to the guide means by an amount corresponding to the laying pitch between two alternate displacements of said guide means.

In its instantaneous movement, the guide member is at all times contained within a plane comprising the trace formed by the thread at the place where it is laid on the support. In order to place a hoop which will define a plane on a support which is assumed stationary, the guide member and the speed vector thereof are at all times included in said plane. This defines the laying principle of the invention. In order to take the movement of the support during the laying into account or in order to lay a hoop which is not inscribed in a plane, there may be slight deviations with respect to this theoretical plane, as will appear from the following description.

The overall movement of the guide member is an alternate reciprocating movement. Upon each change in direction, the thread is preferably held in contact with the support by the action of pressing means.

The expression "manufacture of a tire" is used to include both complete manufacture and partial manufacture, provided that at least one reinforcement is manufactured in accordance with the method of the invention. The term "thread" is used in a very general sense to include a monofilament, a multifilament and an assemblage such as, for instance, a cable of twisted components, and this whatever the nature of the material. In the present specification, the term "hoop" is used to designate a length of thread extending from one individual point to another in the reinforcement. The assembly of these hoops arranged over the entire periphery of the tire forms the reinforcement proper. A hoop in the sense defined here may be part of a carcass or of a crown reinforcement or of any other type of reinforcement. These hoops can be individualized by cutting the thread during the laying, or they may be all connected together in the final reinforcement.

Basically, the invention is concerned with manufacture from a single thread, taken, for instance, from a spool. It is unimportant whether the reinforcement is manufactured, in order to be complete, in several successive passes, with or without cutting of the thread between two passes.

Finally, when defining positions or directions by the words "radially, axially, or circumferentially", or when speaking of radii, there is taken as reference the support or core on which the tire is manufactured, or the tire itself, which comes down to the same thing. The axis or the point of reference is the axis of rotation of the support or its middle point corresponding substantially to its center of gravity.

The method of the invention has another advantage. It makes it possible very easily to produce a reinforcement, for instance a carcass reinforcement, in which the laying pitch of the thread is variable. "Laying pitch" as used herein is the distance resulting from the sum of the difference between two adjacent threads and the diameter of the thread. It is well known that for a carcass reinforcement the distance between threads varies depending on the radius at which it is measured. It is not this variation which is in question here but rather a variable pitch with a given radius. For this, it is sufficient, without changing the tempo of operation of the guide means, to vary the speed of rotation of the support in accordance with any suitable law. During one revolution, the speed thereof will describe a sinusoidal law so that the variation of the pitch is sinusoidal. One thus obtains a tire the carcass reinforcement threads of which, for instance in the case of a radial carcass, are arranged along a pitch presenting a controlled variation for a given radial position.

The invention also proposes a manufacturing machine which permits the carrying out of the method, the thread being delivered upon call by a suitable distributor comprising, for instance, a spool of thread and then a member for controlling the tension of the thread taken from the spool. The machine for the manufacture of a reinforcement from a single thread cooperates with a support (rigid core or reinforced membrane) on which the tire is manufactured.

It is characterized by the fact that it comprises:

a guide means with slippage in which the thread can slide freely, a means for the displacement of said guide means along a reciprocating trajectory, pressers disposed at least at each end of said trajectory in order to apply the thread against the support, the assembly being arranged in such a manner that, when the thread adheres on the support due to the action of a presser, the displacement of said guide means lengthens the path of the thread between said presser and the thread distributor while presenting the thread above the trace which it will have on the support after laying, the laying taking place gradually to the rear of the guide means, and at the latest upon the action of another presser, which itself acts at the latest before the reverse movement of the guide means along its reciprocating trajectory.

For example, the displacement means is formed by an endless flexible strand mounted in a guide circuit (a guide track closed on itself) and curved so as to have the general shape of an arc. This circuit makes it possible to produce the reciprocating movement contemplated in the method of the invention in accordance with a particularly interesting variant since there is no reciprocating movement; the tangential speed of the guide member along the circuit can be constant.

The machine comprises a device for the presenting and adjustment of the position of the guide circuit with respect to the support, the latter being introduced in and between the branches of the arc which it forms.

The guide means consists, for instance, of a pivotal eyelet carried by the flexible strand and within which the reinforcement thread is caused to pass, the pivotal axis being perpendicular to the guide circuit and to the radius passing through the eyelet. Pressers are installed at each end of the arc. They make it possible to grasp the thread each time that it is fed through the eyelet and to apply it against the support.

Finally, the machine comprises means which make it possible to move the flexible strand and drive the support in rotation at a speed which is a function of the time taken by the eyelet to make a complete revolution on the guide circuit and a function of the laying pitch desired for the thread.

It is important to understand that the movement of the support is not a necessary parameter for the method of laying of the invention. The movement of the support is simply necessary in order that the hoops successively wound on the support are arranged adjacent and contiguous. The amplitude of this movement is therefore a function of the thickness of the thread and of the desired distance between two contiguous hoops.

The machine described below is intended, in particular, for the manufacture of carcasses. The arc must therefore extend from one bead to the other; it has the shape of a C. If one designs a machine specifically for crown reinforcements, the arc must go from one shoulder to the other, and would then have the shape of a parenthesis. It goes without saying that one can design a machine which can manufacture both carcass reinforcements and crown reinforcements, as will become clearly evident below.

The guide circuit is curved so that it is in the shape of a C enclosed within a Ω. As from the time that one goes from one point to another, describing a C, it is necessary to describe a Ω in order to close the figure since an "endless" strand is used—a chain in the following description, but this could just as well be a belt or other equivalent means, such as a cable, driven without slippage. The guide circuit is preferably disposed substantially in a plane with one portion of the guide circuit superposed relative to the other portion thereof.

The advantage of this arrangement is that it makes it possible to pass around the support. It therefore makes it possible to reach successively two points of the support each arranged in the region corresponding to a bead of the tire, while freeing a maximum amount of space in the center of the guide circuit in order to be able properly to insert the support. A machine designed in accordance with this principle is capable of laying threads extending from one shoulder to the other for a tire crown reinforcement, even when there is concerned a wide tire (small H/B ratio) and a small laying angle of the thread, which leads to a large circumferential distance between the point located in one shoulder and the point located in the other shoulder.

The adjustment of the position of the guide circuit with respect to the support makes it possible to define the laying trace of the thread on the support. A radial plane is referred to in the following description since there is described therein the production of a carcass for a radial tire, without this, of course, being limitative.

By this method, the guide means—the eyelet in the apparatus illustrated—passes above the support following rather closely the trace desired for the thread in the reinforcement. It is sufficient that the thread adhere to the support at any starting point on the desired trace. The following movement of the eyelet causes the latter to disappear behind the support with respect to this starting point. Consequently, the thread is necessarily laid on the support since it cannot, starting from the starting point, rejoin the eyelet on a straight line. It is seen to it that the reciprocating movement of the eyelet brings it close to points of a thread which are furthest apart in the reinforcement to be manufactured; from one bead to the other in the case of a carcass reinforcement, and from one shoulder to the other in the case of a crown reinforcement.

When it was stated that the thread is applied to the support, this means that it is applied against the support which has been precoated with at least one layer of rubber at that place, so that the tread adheres there, but this obviously does not exclude the presence of other products, whether or not of rubber, and of other reinforcement threads already on the support, depending on the architecture of the tire to be manufactured. The person skilled in the art knows that, in order to manufacture a tire on a support, it is a question of producing a stacking of all the components starting with the one closest to the support, generally the air sealing rubber of the tire. With respect to the invention, the only important thing is that a material to which the thread can adhere be present on the support, at least at the ends of the laying trace of the thread (or at a place very close to them).

DESCRIPTION OF THE DRAWINGS

The following description will make it possible clearly to understand all aspects of the invention, when read with reference to the accompanying drawings, in which.

DESCRIPTION OF PREFERRED EMBODIMENTS

Figure 1:
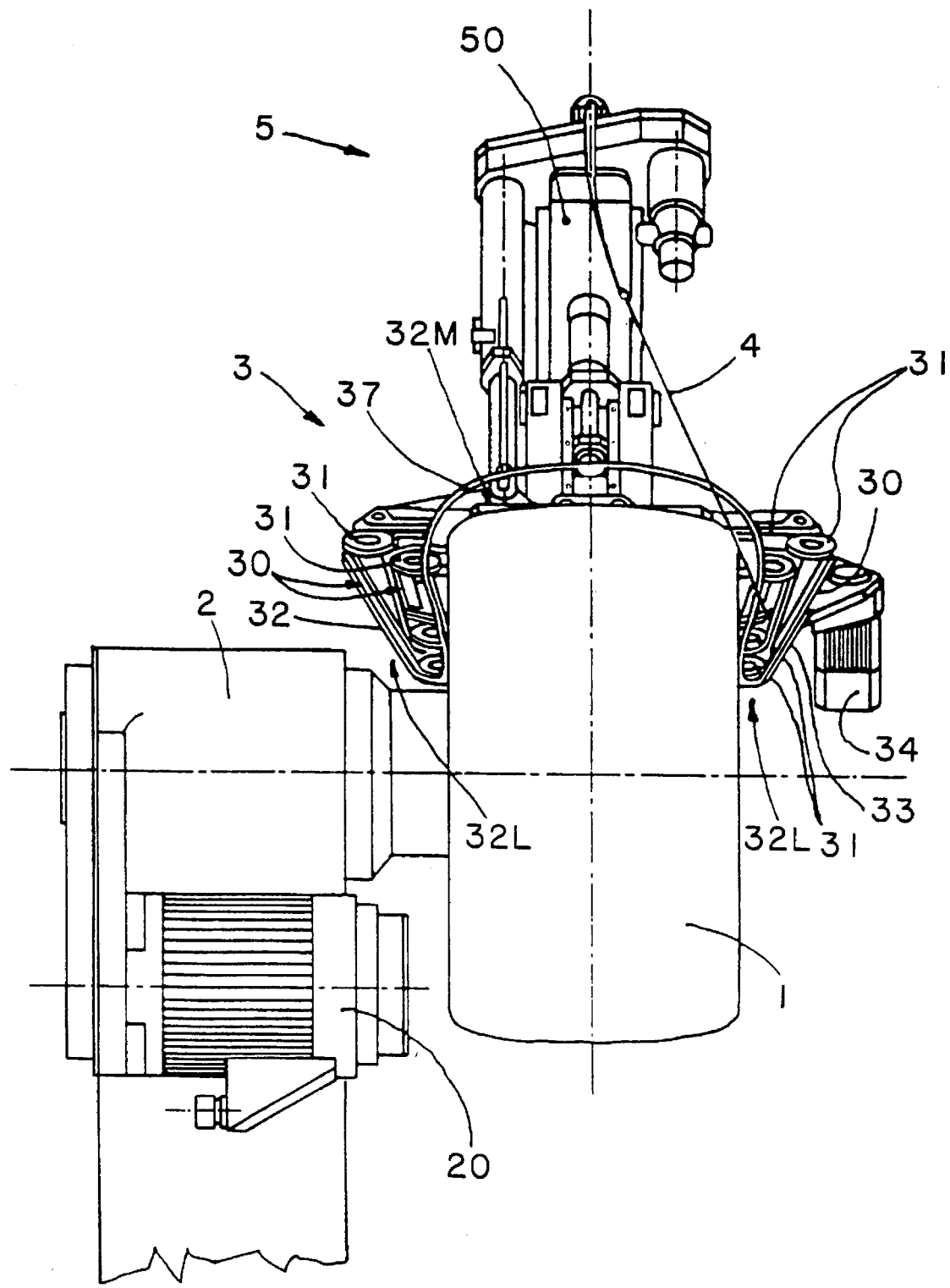
FIG. 1 is a view in elevation of a machine in accordance with the invention.
Figure 2:
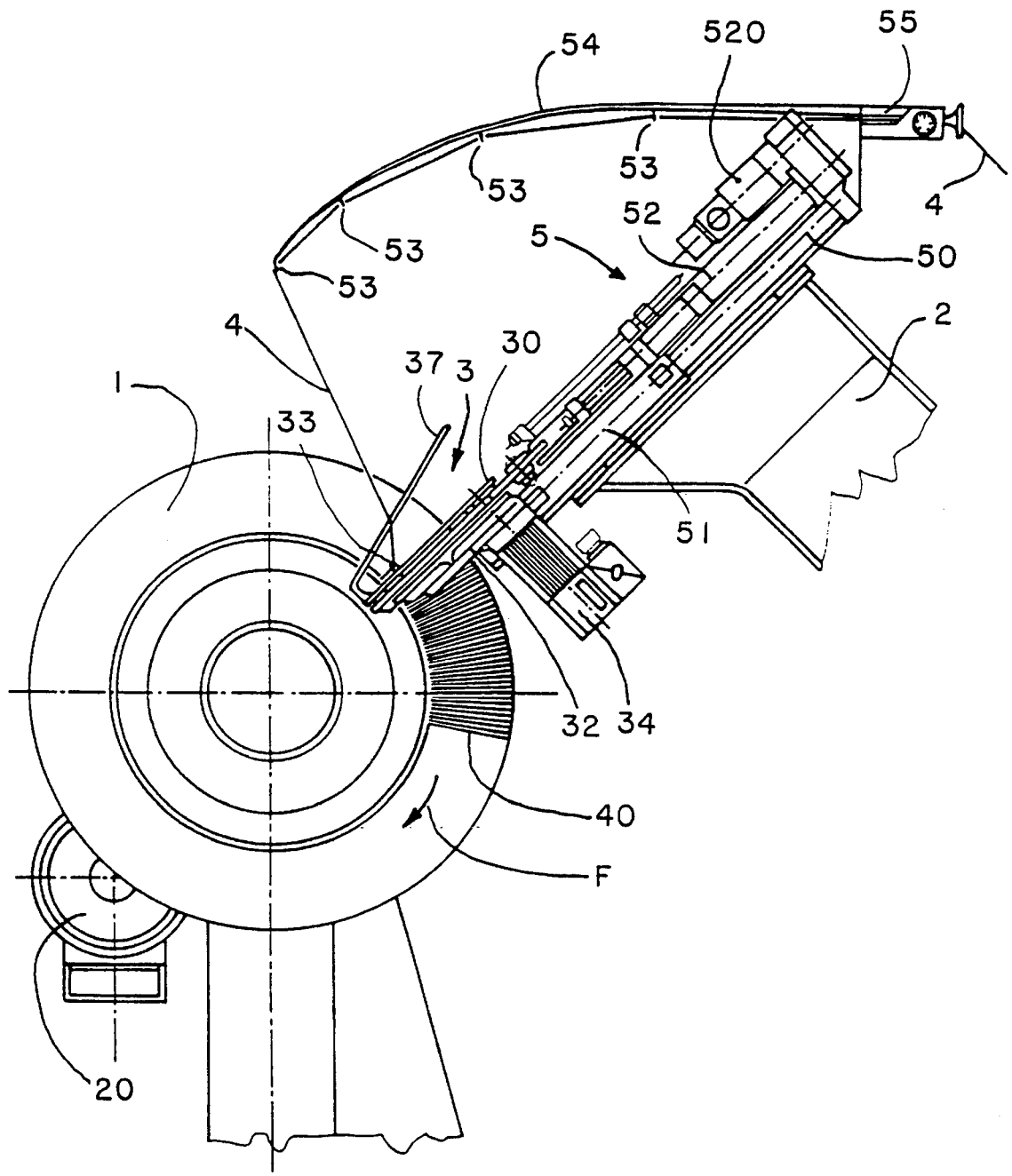
FIG. 2 is a side view of FIG. 1 of the same machine.

In FIGS. 1 and 2 it is seen that a rigid and removable support or core 1 has an outer surface which defines the geometry of the inner surface of the tire. The tire which has been built up thereon has been coated with a layer of sealing rubber having a base of butyl rubber and with a layer of calendering rubber intended to hold the thread by adherence.

The core 1 is mounted on a frame 2 and is driven in rotation by the motor 20.

The laying apparatus 3 for the thread 4 comprises a roller chain 30 serving as flexible strand. The chain 30 is guided on pulleys 31 which are mounted on a supporting cradle 32. The overall arrangement thus produced serves as guide circuit. The circuit which the chain 30 moves over has the shape of a C. The supporting cradle 32 comprises a central part 32M and two side parts 32L articulated on the central part 32M, as will be explained in greater detail with reference to FIG. 18. The path defined by the circuit of the chain forms a sort of clamp the opening of which is adjustable. It can be adapted to several widths of core 1 and can open sufficiently to accommodate the largest part of the core 1.

The central part 32M of the support 32 is mounted on a device 5 for the presentation and adjustment of the position of the apparatus 3 with respect to the core 1. This device comprises a slide rail 50 which is rigidly fastened on the frame 2, so directed that the circuit is directed radially. A chassis 51 is fixed on the rail 50 and can slide on it. Its sliding movement is controlled by a screw jack 52 controlled by the motor 520.

The thread 4 is delivered by a spool (not shown) via a tensioner 55 which assures control of the tension, and then is guided by the rings 53 of a cane 54, the flexibility of which assures the necessary compensation between the apparatus 3, which requires that the thread be delivered to it at a cyclically variable speed, which may be negative, and the upstream tensioner 55, which prevents any return backward. A deviation rod 37 prevents the thread 4 from coming into contact with the core 1 prematurely. This thread 4 is threaded through an eyelet 33 pivotally mounted on the chain 30. The chain 30 is driven by the motor 34; the eyelet 33 describes a reciprocating movement from one bead to the other, or, more precisely, from a place close to one bead to a place close to the other bead.

The slide rail 50 is fastened on the frame 2 in such a manner that the eyelet 33 describes its reciprocating movement above and below the core in a radial plane. This method makes it possible to lay a thread 4 forming a radial carcass, the thread then forming radial hoops 40 on the core 1, as can be noted from FIG. 2. The arrow F represents the direction of rotation of the core 1.

The machine described here is not intended to produce anything but radial carcasses. It goes without saying, however, that the invention is not limited to this application. In order to adopt a laying plane which is inclined with respect to the axis and, in particular, in order to lay crown reinforcements, it is sufficient to provide a degree of freedom of rotation of the rail 50 around a radially oriented axis, passing through the center of the core 1, which makes it possible to orient the support 32 with respect to the core 1.

One can very easily provide for opening the guide circuit formed by the chain 30 sufficiently so that, by having presented it along an angle typical for a crown reinforcement (for example, 15° to 25°), the reciprocation of the eyelet 33 brings it from one shoulder to the other above the core 1, this permitting the laying of hoops constituting the belt of a radial tire.

In order to produce a crossed carcass or else to depart slightly from a purely radial orientation, one can provide for inclining the support 32 with respect to the radial plane by swinging it around an axis parallel to the axis of rotation. Of course, this adjustment can be combined with that applied in the preceding paragraph, in particular in order to produce crossed carcass reinforcements. One can furthermore, without making any change in the parts of the machine as described, drive the core at a rather high speed, for instance ⅛ revolution for ½ revolution of the chain 30 so as to obtain a laying angle of the thread which is a function of the ratio between the speed of the chain and the speed of the core. One thus notes that the machine also makes it possible optionally to introduce the movement of rotation of the support as laying parameter of the thread.

Figure 3:
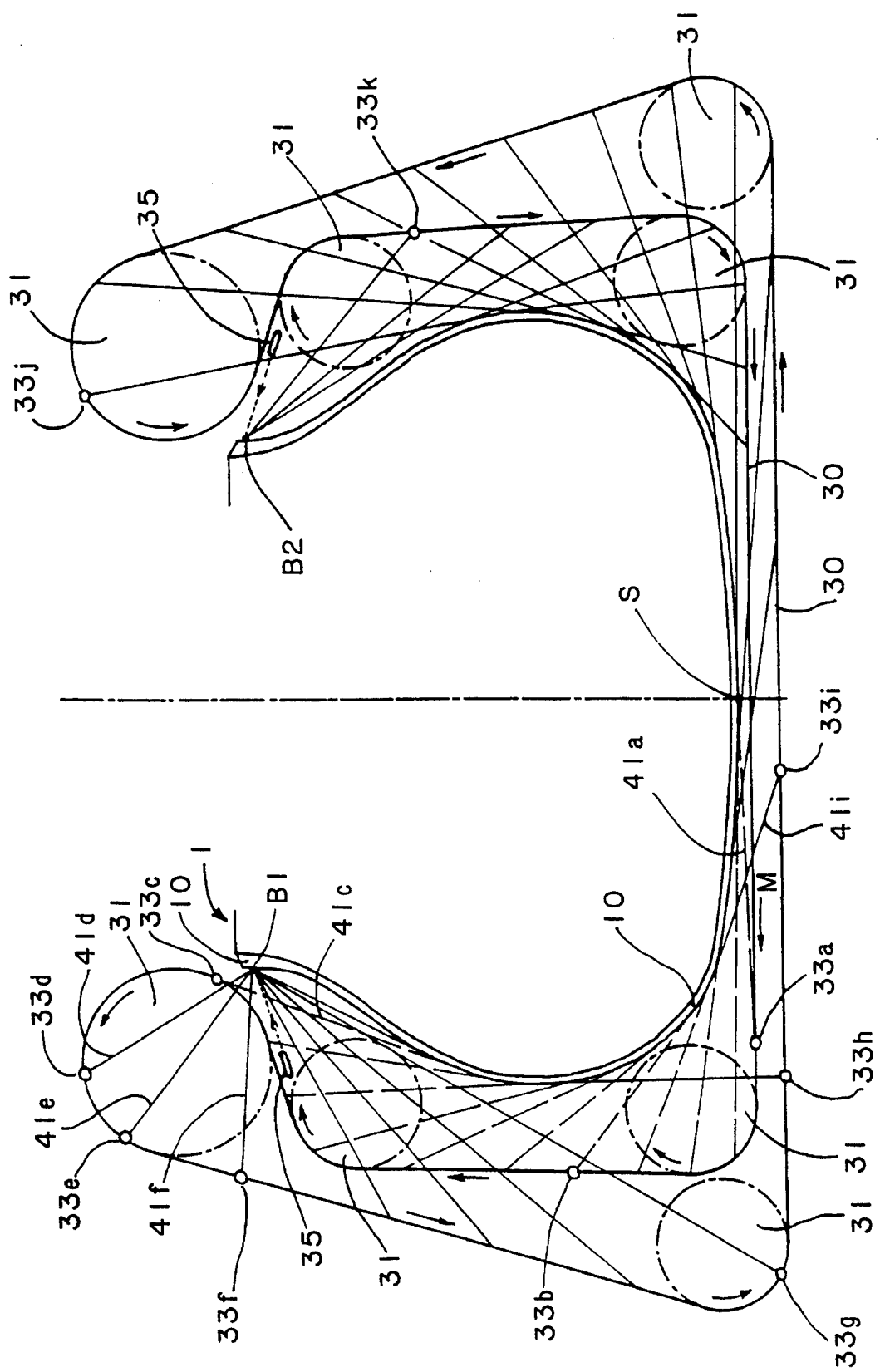
FIG. 3 is a diagram showing, in a projection on a radial plane, the shape which the thread assumes at successive moments when it is laid in accordance with the method of the invention.

FIG. 3, by the detailed explanation of the basic movement, makes it possible clearly to understand how the laying of a thread 4 on the core 1 is assured. We note, first of all, that the core is covered with the necessary layer or layers of rubber 10, as well as other reinforcement threads which may be necessary, in particular, at the level of each bead. There can be noted the pulleys 31 on which the roller chain 30 is mounted, an arrow on each pulley indicating the direction of its movement. It is assumed, first of all, that the thread 4 is maintained applied on the core 1 at any place of its desired trajectory on the tire, for instance at the middle S of the crown of the core 1. The eyelet 33 is assumed to be at 33$a$ and it moves away from S in the direction indicated by the arrow M. The thread 4 is disposed as indicated by the dashed line 41$a$.

The continuation of the movement of the eyelet 33 causes the sliding of the thread 4 within the eyelet and therefore the feeding of thread 4, since the latter is delivered initially substantially in the central plane of the core 1 by the cane 54, as can be noted, in particular, from FIG. 1. The further positions of the eyelet 33 are marked 33$b$, 33$c$, ..., 33$k$. The successive shapes assumed by the thread 4 are represented by families of curves; the first family of curves in dashed line, then a second family of curves in continuous line. Having arrived at 33$b$, it is seen that there is no straight line possible between 33$b$ and S; the thread 4 is therefore wound on the crown of the core 1. When the eyelet 33 has arrived at 33$c$, one of the pressers 35 arranged at each end of the guide circuit grasps the thread 4 and applies it against the core at B1. The first family of curves stops at 41$c$.

These pressers 35 are adjusted to act when the eyelet 33 has brought the thread 4 to each end of the guide circuit and when the thread 4 is arranged between the core 1 and the said pressers 35.

Figure 4:
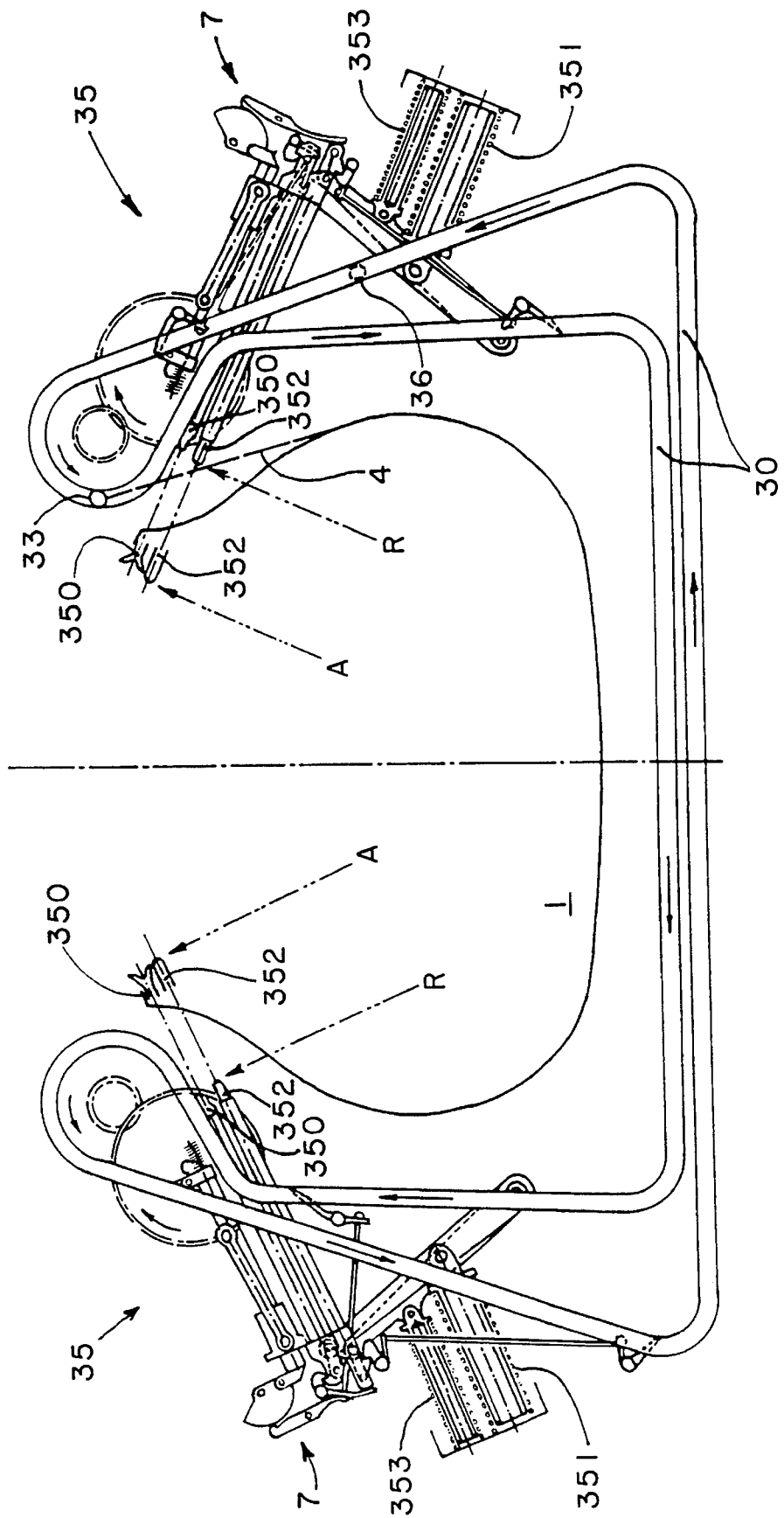
FIG. 4 is a general view of the main parts of the thread-laying apparatus.

As from the point B1, the successive positions of the thread 4 driven by the eyelet 33 trace a new family of curves, shown in continuous lines, the first of which 41$d$ extends up to the position 33$d$ of the eyelet on one of the pulleys 31 (the left-hand one in FIG. 4). It is seen that, between 33$e$ and 33$f$ and then again between 33$g$ and 33$h$, and then again between 33$j$ and 33$k$, the distance between the last point where the thread is glued on the core 1 and the eyelet 33 decreases. This is why the feeding of thread 4 by the apparatus 3 must be capable of swallowing up thread 4 and in general be capable of maintaining tension in the thread 4 despite the very great fluctuations in the feeding of the thread by the apparatus 3. The family of curves 41$d$, 41$e$, ..., 41$i$, ... makes it possible clearly to see how the thread 4 is progressively laid on the core 1. Finally, when the eyelet 33 has arrived at 33$k$, the other presser 35 acts to apply the thread against the point B2 in the bead.

Figure 5:
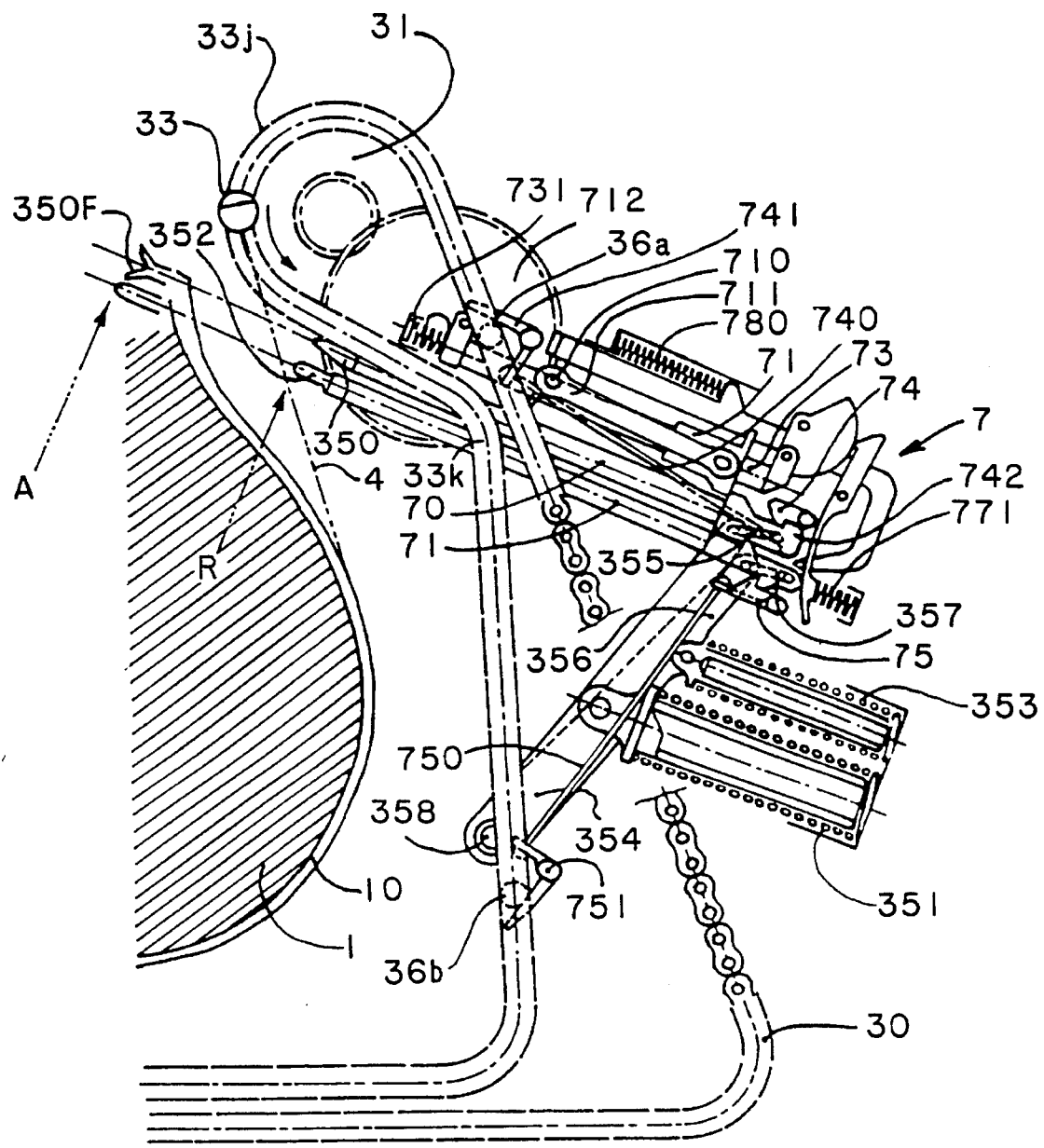
FIG. 5 is an enlarged view of the right-hand portion of FIG. 4.

In FIGS. 4 and 5, it is seen that each of the pressers 35 developed for the machine in accordance with the invention has a fork 350 which is movable between a retracted position at R, away from the core 1, and an advanced position at A. The position shown at A is the position which the fork 350 would assume in the absence of the core 1, under the effect of the spring 351 which pushes against the fork 350 via the lever 354 and the connecting link 355. In actual use, the fork 350 is stopped when it comes into contact with the component parts of the tire on which have already been deposited a rubber covering and possibly reinforcement threads; it therefore makes it possible to apply the thread 4 with sufficient force so that it adheres properly at the desired place.

The movement of the eyelet between the points 33$j$ and 33$k$ of FIG. 3 makes it possible for it to hook the thread 4 on the fork 350 when it is in retracted position R (see also FIG. 5). It will be noted that its two branches are then disposed in a plane perpendicular to the plane of FIG. 4 or FIG. 5, which permits the fork 350 to retain the thread 4 which is presented to it by the eyelet 33.

The fork 350 then passes into the advanced position A. At the start of its movement of advance, the fork 350 carries out at the same time a quarter of a revolution so that its two arms come into the plane of FIGS. 4 and 5 well before having reached the core 1. On each side of the core, this quarter revolution brings the branch which is present on the side where the thread is presented to the fork 350 on the side of the greatest radii.

When examining FIGS. 4 and 5, it is considered that the thread 4 is conducted above the plane of the figure; the branch 350F of the forks 350 which, in retracted position R, protrudes out of the plane of the figure towards the observer—otherwise stated, on the side where the thread 4 is delivered—swings towards the largest radii during the movement towards the position A. We also note that each hoop 40 of thread 4 laid by the machine disappears behind the plane of FIG. 4, which defines the direction of rotation of the core 1, which also appears in FIG. 2.

The pressers preferably also have a hammer 352 which contributes to perfecting the anchoring of the thread 4 in the layer of rubber on the core 1. This hammer 352 is itself movable between the retracted position, at R, and an advanced position, at A. It advances towards the core 1 under the effect of the spring 353, which pushes against the hammer 352 via the lever 356 and the connecting link 357. The levers 354 and 356 both have the same pivot point 358.

The hammer 352 acts after the fork 350; it advances towards the core 1 after the fork 350 has applied the thread 4 against the core 1; it rests on the thread 4 at a slightly higher radial position and holds the thread 4 when the fork 350 retracts. This avoids the latter carrying along with it the loop of thread 4 which is formed around one of its branches and which, even if it is glued on the rubber, could have a tendency to remain integral with the fork. The anchoring of the thread 4 in the bead is made perfectly reliable. It is sufficient that the hammer 352 return to its retracted position in time for its action upon the next presentation of thread 4 by the eyelet 33.

The swinging in advanced position and in retracted position both for the fork 350 and for the hammer 352 is preferably controlled by a pin 36 fastened on the chain 30 on the side opposite the eyelet 33. Referred to the plane of FIG. 4 or 5, the eyelet 33 is above—on the feed side of thread 4—and the pin 36 is below, as well as the cocking and release mechanisms 7 actuating the forks 350 and the hammers 352.

FIGS. 6 to 13 illustrate in greater detail one of these mechanisms 7, which are identical on each side of the guide circuit. By consulting in parallel FIG. 5 it will be clearly understood how and at what moment of the cycle these mechanisms cooperate with the chain 30 which forms the tempo of the operation of the apparatus 3 and how they cause the movements of the forks 350 and of the hammers 352.

The tail 70 of the fork 350 as well as the tail 72 of the hammer 352 can be noted. A slide 71 slides on a rod 73. The slide 71 continuously carries out a reciprocating movement under the action of a connecting rod 711 (see FIG. 5) driven by a wrist pin 710 mounted on a gear 712. The latter is driven in rotation by the end pulley 31 of the guide circuit.

Figure 6:
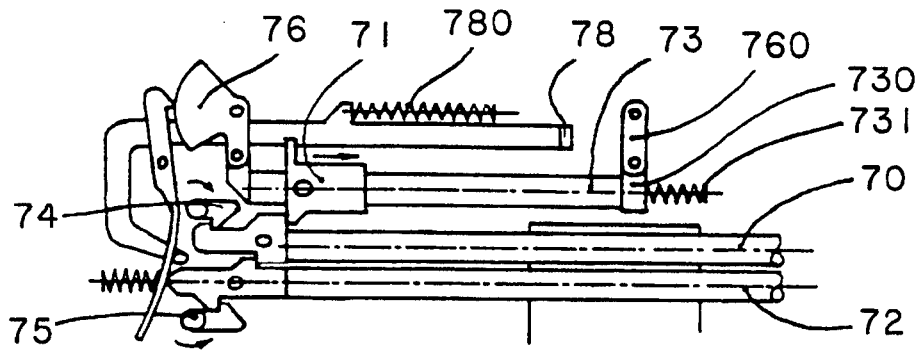
FIGS. 6 to 13 show successive stages of the operation of the pressers used in the machine of the invention.
Figure 7:
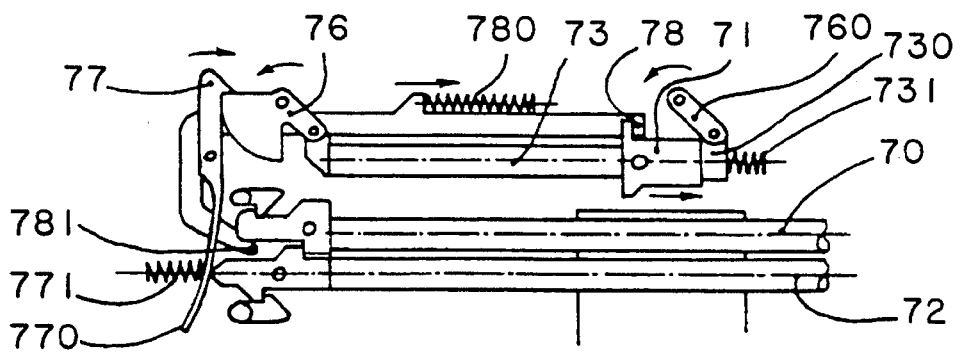
Figure 8:
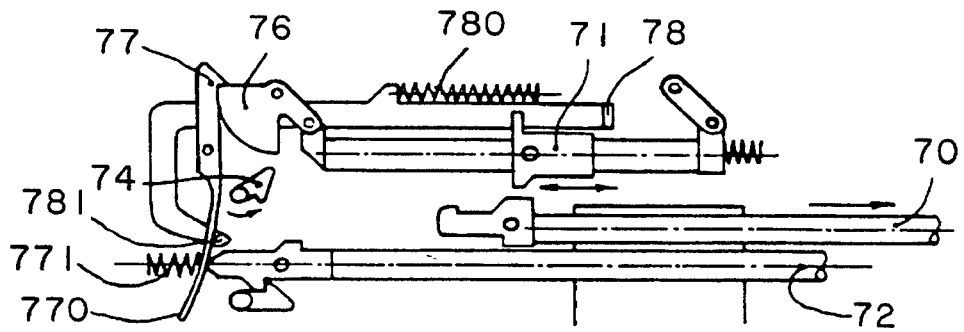

In FIG. 6, the tails 70 and 72 are held by pawls 74 and 75 respectively. The rod 73 forms a parallelogram with the cam 76 and the connecting link 760, which parallelogram can be deformed as shown in FIG. 7; having arrived at the end of the rod 73, the slide 71 rests on the shoulder 730 against the opposing spring 731; the cam 76 turns, which permits the latch 77 to retain it in the position shown in FIG. 7. This terminates the cocking of the mechanism. Subsequently, aside from the action of the pin 36, the mechanism remains in cocked position, even while the slide 71 continues its reciprocating movement on the rod 73 and each time acts on the trigger 78 which recoils against the pressure of the spring 780, which furthermore causes the catch 781 to retract.

The rear lug 770 of the latch 77, which would have a tendency to advance towards the right in FIG. 7 under the action of the spring 771, is held in locked position by the catch 781 and by the tail 72 of the hammer, which act in parallel. Therefore, as long as the catch 781 and the tail 72 are not both advanced towards the right at the same time, the rear lug 770 of the latch remains stationary, and the latch 77 prevents the cam 76 from turning.

In FIG. 5, there can be seen the position 36a in which the pin 36 releases the advance of the fork 350. By a cascade of two angle returns 741, 742 and a tie rod 740, the pawl 74 is lifted (FIGS. 5 and 8), which frees the tail 70. Instantaneously, under the action of the spring 351, the fork 350 and the tail 70 of the fork advance, towards the right in FIG. 8, towards the advanced position A of FIG. 4. Since the latch 77 has not yet released the cam 76, this movement of advance can take place without the tail 70 striking the slide 71. The reciprocating movement of the slide 71 continues freely.

Figure 9:
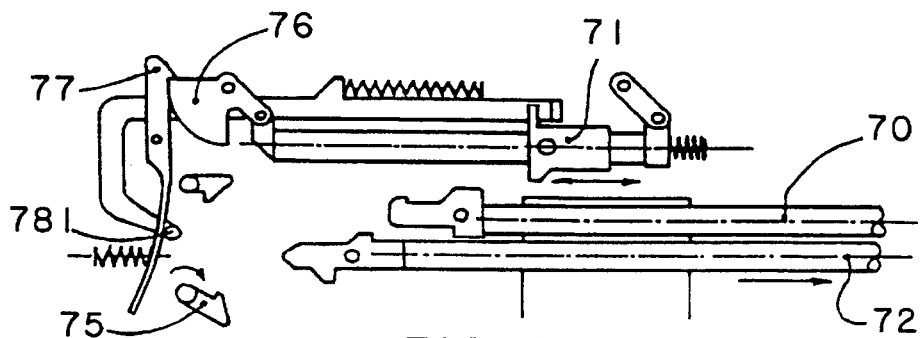
Figure 10:
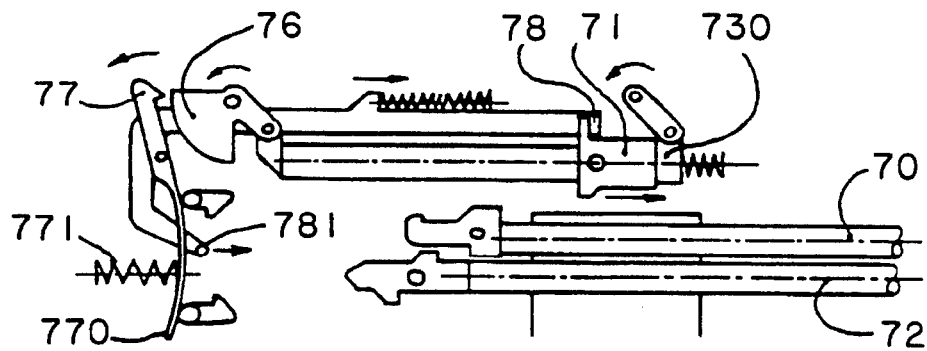

When the pin has arrived at the position 36b of FIG. 5, another cascade consisting of a tie rod 750 and an angle return 751, the pawl 75 releases the tail 72 (FIGS. 5 and 9). Instantaneously, under the action of the spring 353, the hammer 352 and the tail 72 advance, towards the right in FIG. 9, and towards the advanced position of FIG. 4. It will be noted that the latch 77 is now retained only by catch 781.

Figure 11:
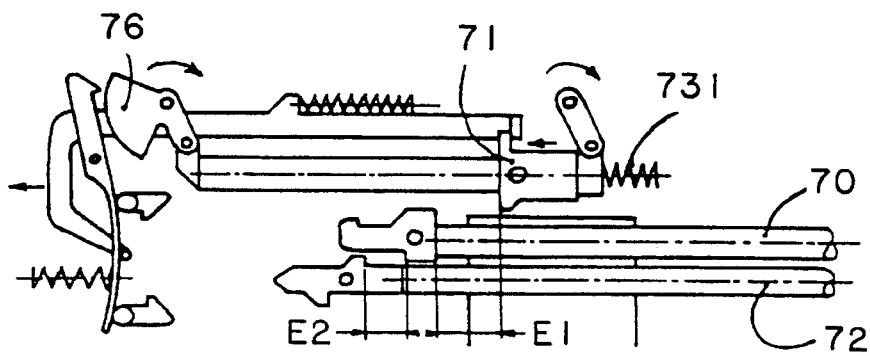
Figure 12:
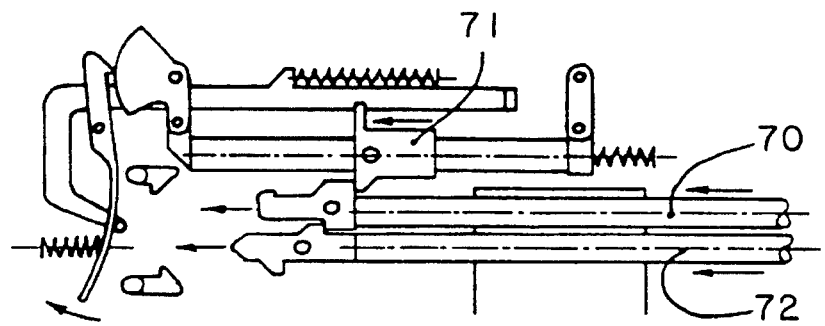
Figure 13:
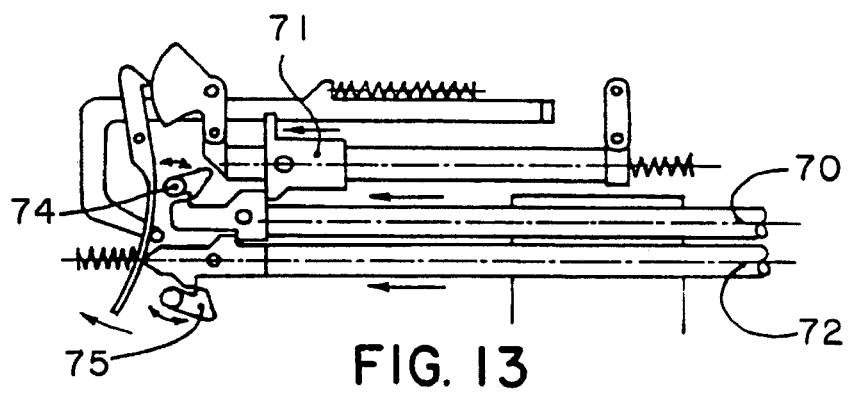

As soon as the slide 71 rests on the shoulder 730 and on the trigger 78 (FIG. 10), the catch 781 frees the latch 77 and the cam 76 swings, under the push of the spring 731 (FIG. 11). The return of the slide 71 drives the tails 70 and 72 towards their cocked position (FIG. 12) in which they are held by the pawls 74 and 75 (FIG. 13). The locking then takes place as explained above.

The differences E1 and E2 which are clearly visible in FIG. 11 between the positions of the tails 70 and 72 and of the slide 71 make it possible to assure that the hammer 352 will always arrive at the advanced position before the recocking takes place and that upon the recocking the fork 350 will retract prior to the hammer 352.

Figure 24:
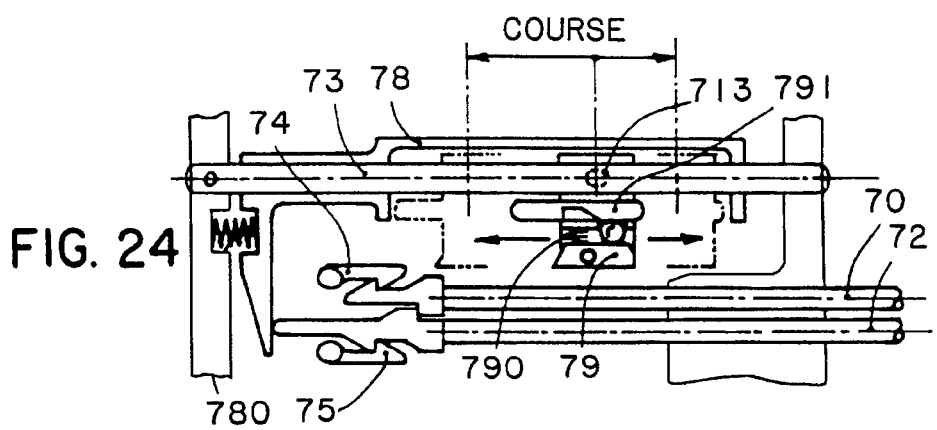
FIGS. 24 to 29 represent the successive stages of the control of the pressors in accordance with a variant embodiment.
Figure 25:
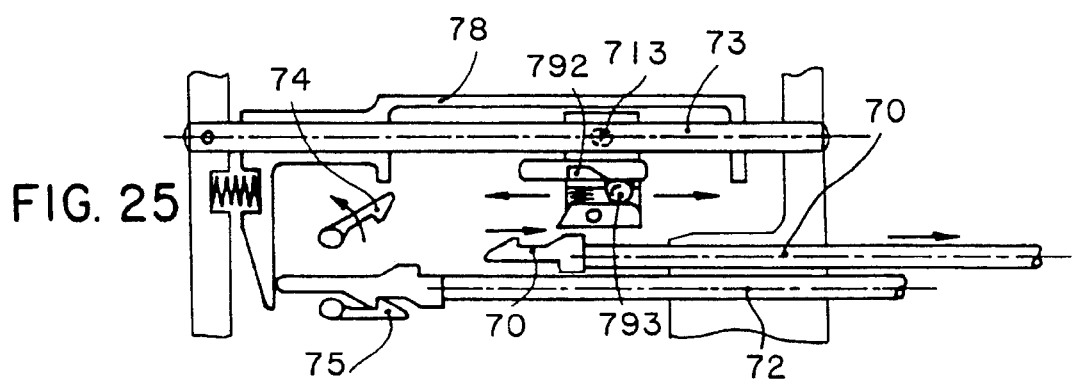
Figure 26:
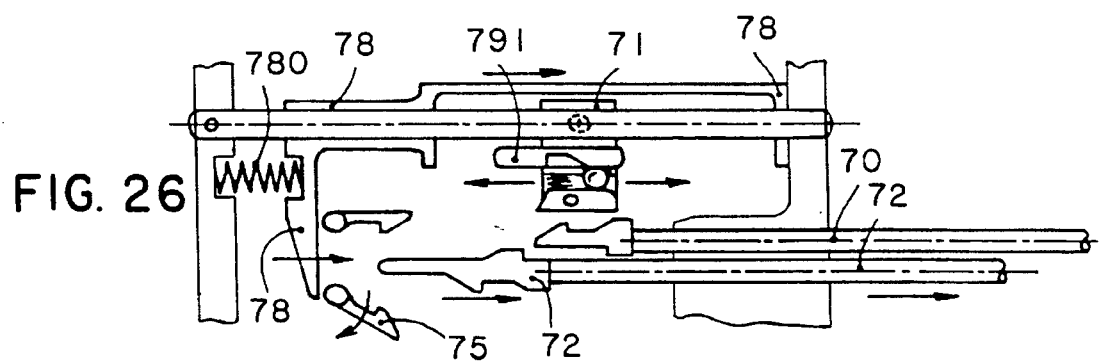
Figure 27:
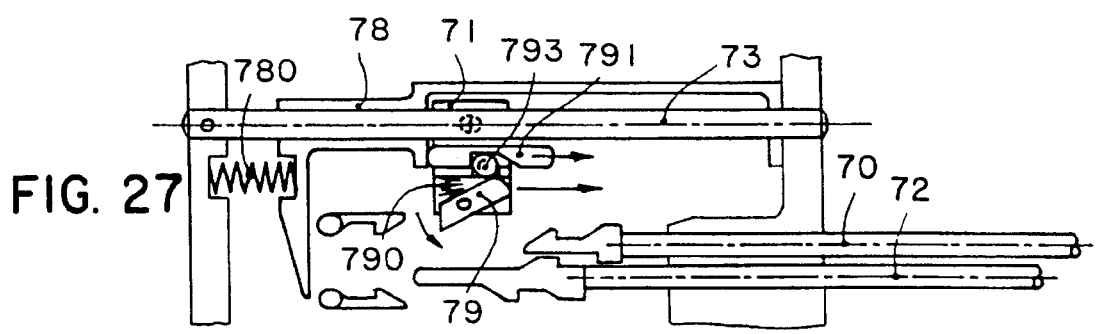

As a variant, the slide 71 has a pin 79 to integrate the function obtained by the deformation of the parallelogram permitting the cocking of the forks and hammers. By consulting FIG. 24 and following figures, it is seen that the rod 73 which receives the slide 71 is this time stationary. As previously, the slide 71 is actuated by the connecting rod 711 visible in FIG. 5, the head of which is connected to the point 713. Under the pressure of the spring 790, the pin 79 tends to assume the deployed position shown in FIG. 27. A pusher 791 can slide in the slide 79 and assume either the position shown in FIG. 27 or that shown in FIG. 24. This pusher 791 has a housing 792 which receives a ball 793. The trigger 78 is here slidably mounted on the rod 73 and naturally assumes the position shown in FIG. 26 under the pressure of the spring 780.

Figure 23:
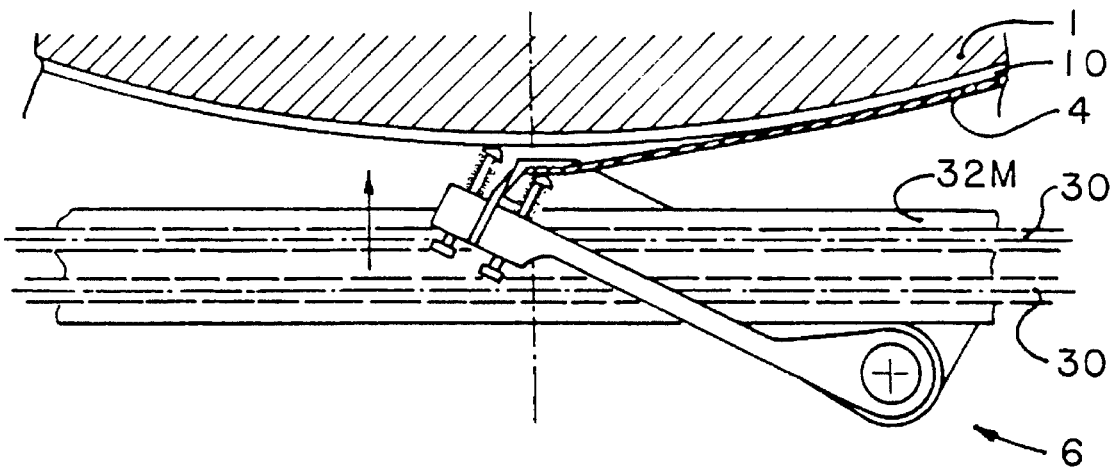
FIG. 23 illustrates the initial phase of the manufacture of a reinforcement.
Figure 28:
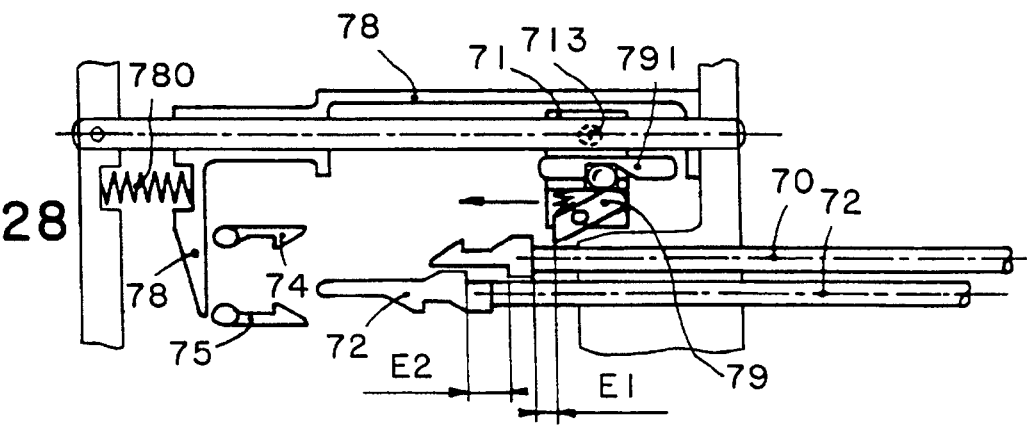
Figure 29:
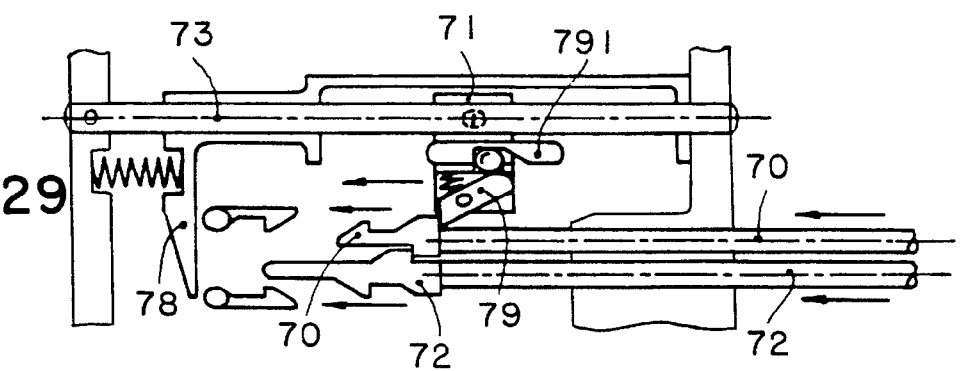

The release of the fork and of the hammer is controlled by the pawls 74 and 75 as in the previous variant. At the time of the second release, one is in the position shown in FIG. 26. Thereupon, as soon as the slide 71 reaches the left-hand dead center in FIG. 27, the trigger 78 pushes the pusher 791 back so that the housing 792 is brought opposite the ball 793 which permits the pin 79 to deploy itself. Upon the next displacement of the slide 71, the pin 79 moves away above the tail 70 of the fork and deploys again beyond it. Upon the next displacement in opposite direction of the slide 79 (FIG. 28), the pin 79 drives the tails 70 and 72 towards their cocked position (FIG. 29), which also pushes the trigger 78 back against the pressure of the spring 780. Thereupon, upon the next movement of the slide 71, the pusher 791 comes against the other side of the trigger 78 and slides in the slide. The ball 793 is pushed back by the ramp contiguous to the housing 792 and presses against the pin 79. The latter moves away within the slide 71 (FIG. 23) which can then continue its reciprocating movement without encountering the tail 70.

Figure 14:
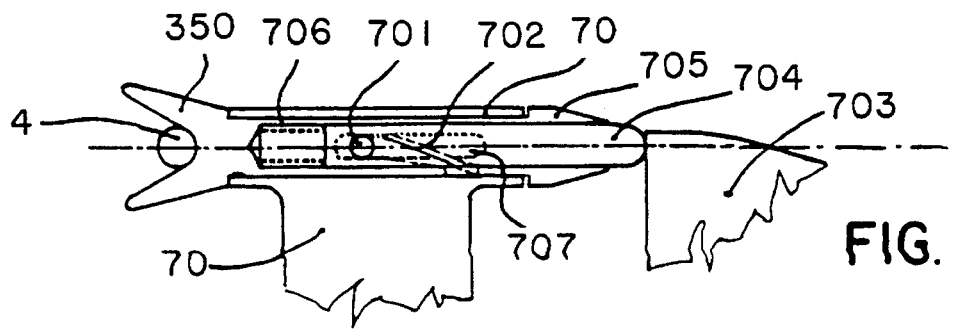
FIGS. 14 to 17 show the component parts of the pressers at successive instants.
Figure 15:
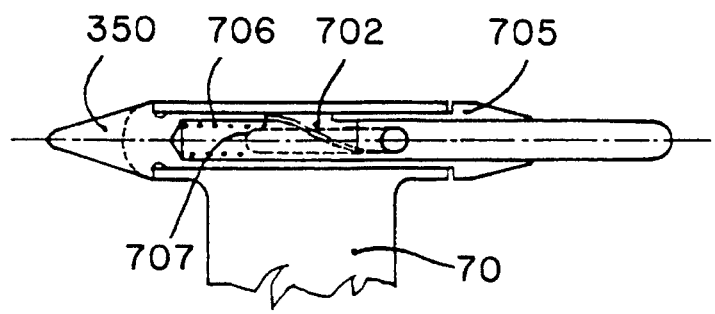

The rotation by one quarter of a revolution of the fork 350 is illustrated in FIGS. 14 and 15. The fork 350 is mounted for possible rotation on a bearing which appears at the end of the tail 70. This rotation is controlled by the dog 701 of a pusher 704. The dog 701 is engaged in a helicoidal hole 702 hollowed within the sheath 705 extending the fork 350 at the rear and is also engaged in a right-hand hole 707 recessed in the bearing appearing at the end of the tail 70. The pusher 704 advances within the fork 350 when it encounters a stop 703, in retracted position R of the fork 350 (FIG. 14), and the pusher returns to its position of rest (FIG. 15) under the action of the spring 706 as soon as the fork 350 advances. The penetration of the pusher 704 into the sheath 705 permits the dog 701 to act on the hole 702 in order to cause the rotation of a quarter of a revolution.

When the eyelet 33 passes from position 33i (FIG. 3) to position 33k, the thread 4 passes over the stop 703 and then over one of the branches of the fork 350, being offset slightly out of the plane (axis line in FIG. 14) in which it is stretched (between the last point where it is already applied against the core 1 and the eyelet 33), due to ramps which are clearly visible in FIG. 14 and which enable it not to remain hooked to the rear of the fork 350.

Figure 16:
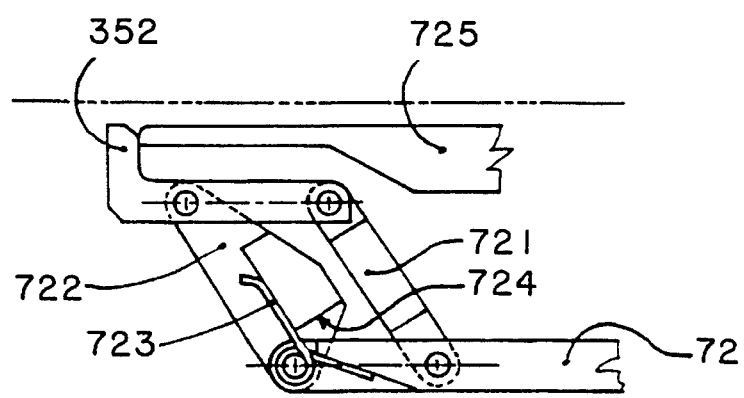
Figure 17:
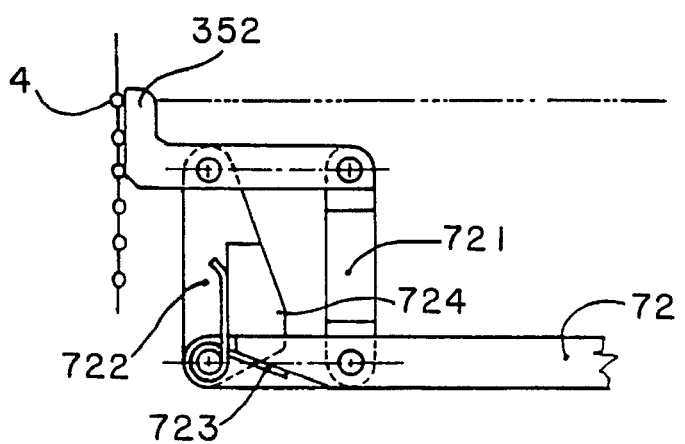

In FIG. 16, it can be seen that the hammer 352 is mounted on its tail by two parallel connecting rods 721, 722. On one of them, 722, there acts a torsion spring 723 which tends to make the connecting rods turn in clockwise direction. A stop 724 which is integral with the connecting rod 722 comes into contact with the tail 72 when the hammer 352 is in raised position (FIG. 17). When the hammer returns to the retracted position, at R, it encounters a stop 725 which forces it to move away slightly (FIG. 16), due to which it in no way disturbs the thread 4 when it is driven by the eyelet 33. The axis line in FIGS. 16 and 17 is the trace of the plane in which the thread 4 passes. As soon as the hammer 352 has left the stop 725, that is to say as soon as it advances, it rises in order to be able to act suitably on the thread 4 which has just been brought towards the core 1 by the fork 350. The movement of the hammer 352 sweeps the plane represented by its axis line trace in FIG. 17.

The principle of the winding of a thread on the support presupposes that the support be convex, or at least have only slight concavities, of the type of those present between the beads and the sidewalls of a tire. Now, certain tires are provided with a large central groove, as can be noted, for instance in U.S. Pat. No. 3,830,273. In order to accept curvatures of the support of large concavity it is sufficient to add, opposite the concavity or concavities a presser or additional pressers which make it possible to apply the thread in the bottom of the concavity or concavities. The action at the proper time of these additional pressers disposed this time no longer at the ends of the trace of a hoop but at an intermediate position, takes place precisely in accordance with the principle explained for the pressers 35. Such a presser comprises simply a hammer 352, the fork 350 being superfluous to the extent that the trace of the thread laid remains inscribable in the same plane on both sides of the point of the thread 4 on which the presser acts.

Figure 18:
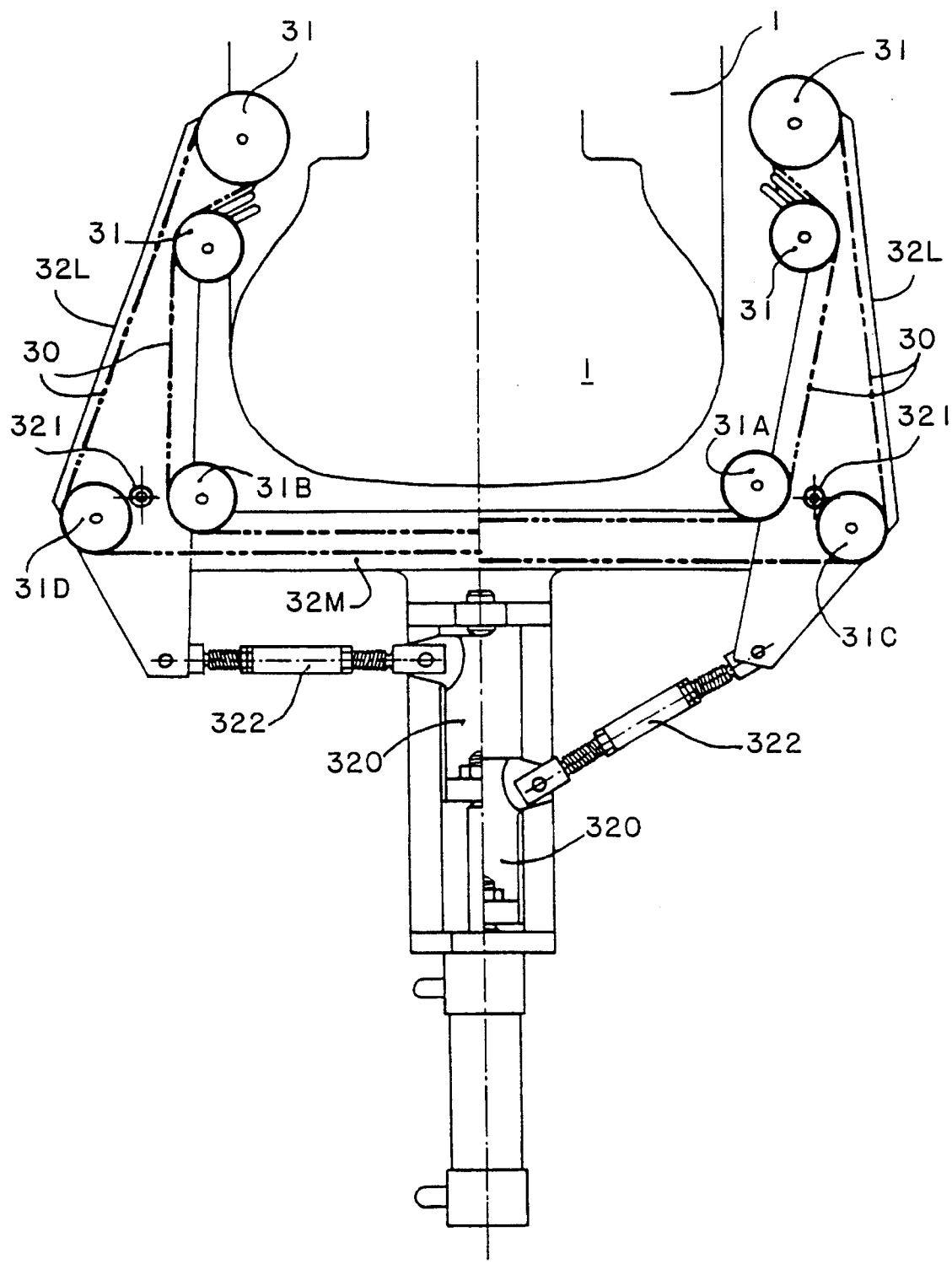
FIG. 18 illustrates an adjustment of the thread laying apparatus.

The opening of the guide circuit is explained with reference to FIG. 18. There can be noted the central part 32M of the support 32. The side parts 32L are articulated at 321 on the central part 32M. The movement of the side parts 32L is controlled by the sliding of the cursor 320 acting symmetrically on the side parts 32 via the rods 322. In order that the chain 30 can pass over a circuit of constant length, whatever the opening of the guide circuit, one can either judiciously select the point of articulation 321 or provide additional tension pulleys (not shown in order not to clutter the drawing) or confer the role of providing tension on one of the pulleys 31 guiding the chain 30.

The manufacture of a reinforcement makes it necessary to coordinate the rotation of the core 1 and the movement of the chain 30 by a judicious control of the motors 20 and 34. For one revolution of the chain 30, the core 1 must have turned through a small angle corresponding to twice the laying pitch P desired for the threads 4 since two hoops 40 of thread 4 are laid for a complete revolution of the eyelet 33. In the simplest embodiment, the ratio of the speeds of the core 1 and the chain 30 is constant. Now, in order to produce a radial carcass, it is desired to have successive hoops 40 of thread (see FIG. 2) in a radial plane. For this, it would be advisable for the core 1 to turn in fits and starts: rotation of the angle corresponding to the proper pitch at the time when the pressers 35 press the thread 4 against the core, and stopping of the core 1 for the entire time that it is necessary in order to lay a radial hoop.

In order to maintain a continuous movement of the core 1, the invention purposes the use of a palliative: The pulleys 31A and 31B arranged on opposite sides of the central part 32M supporting the strand on the forward path and the pulleys 31C, 31D disposed on opposite sides of the central part 32M supporting the return strand are slightly offset circumferentially (taking the core 1 as reference) so that, taking into account the movement of relative rotation between eyelet 33 and core 1 while the eyelet 33 passes from one side to the other of the core 1, the thread 4 is placed on the top of the core 1 very substantially along the theoretical plane containing the trajectory desired for the thread 4 on the core 1 in each of the two directions of axial movement of the eyelet 33 with respect to the core 1. Thus, the threads 4 are arranged almost ideally in radial hoops 40.

In the counter-curvature of the core 1 corresponding to the start of the sidewalls just after the beads, it is further necessary to complete the adherence of the thread 4 on the core 1. In practice, it is not necessary to do anything specific: It has been found that the subsequent application of a layer of calendering rubber or of any other product used in the rest of the manufacture of the tire is sufficient.

Figure 19:
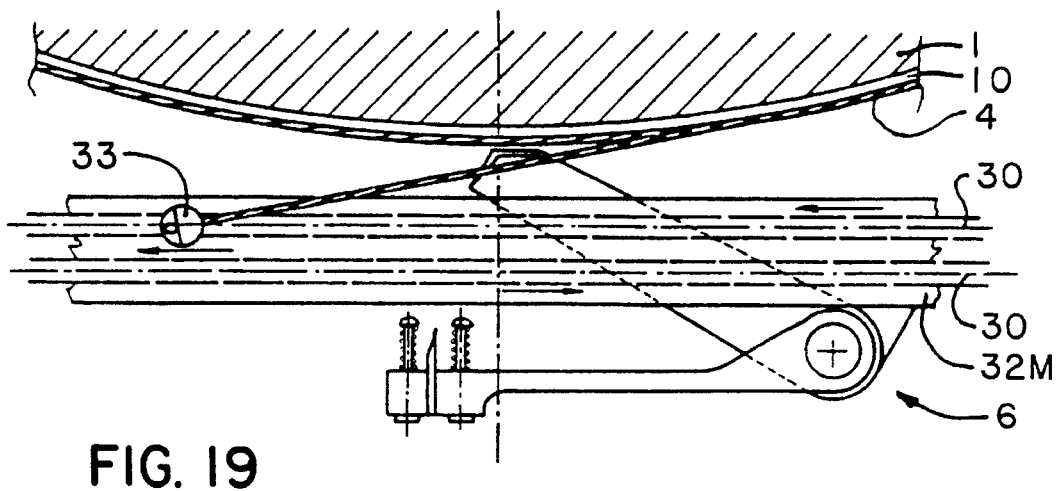
FIGS. 19 to 21 illustrate the final phase of the manufacture of a reinforcement.
Figure 20:
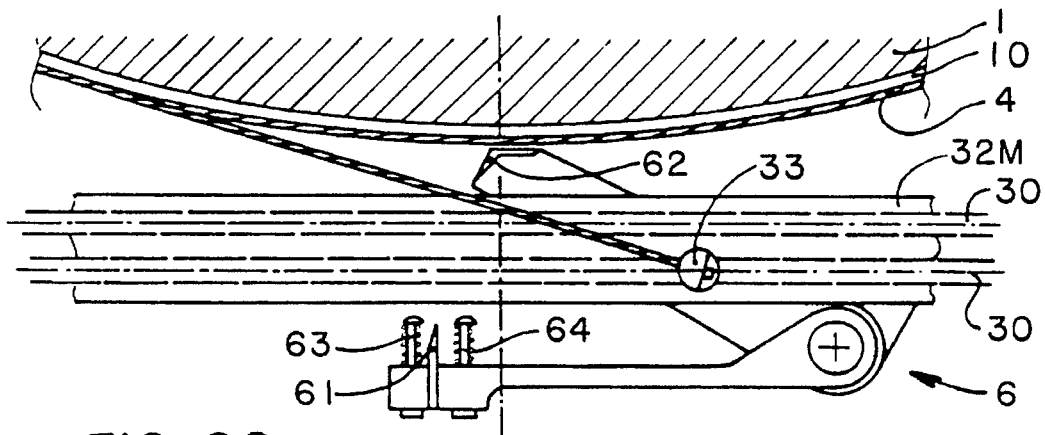
Figure 21:
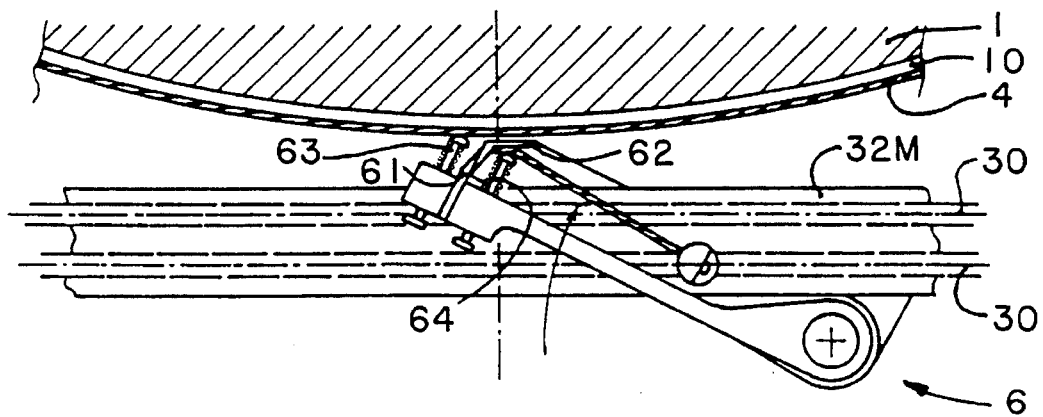

FIGS. 19 to 23 illustrate on their part a member 6 which makes it possible to automate the starting and stopping of the manufacture of reinforcement. This member 6 is fastened on the central part 32M of the support 32, where it can be moved away when not used, in order not to interfere with the laying of the thread 4 (FIG. 19). It comprises a knife 61, a counter-blade 62, and two fingers 63, 64.

Figure 22:
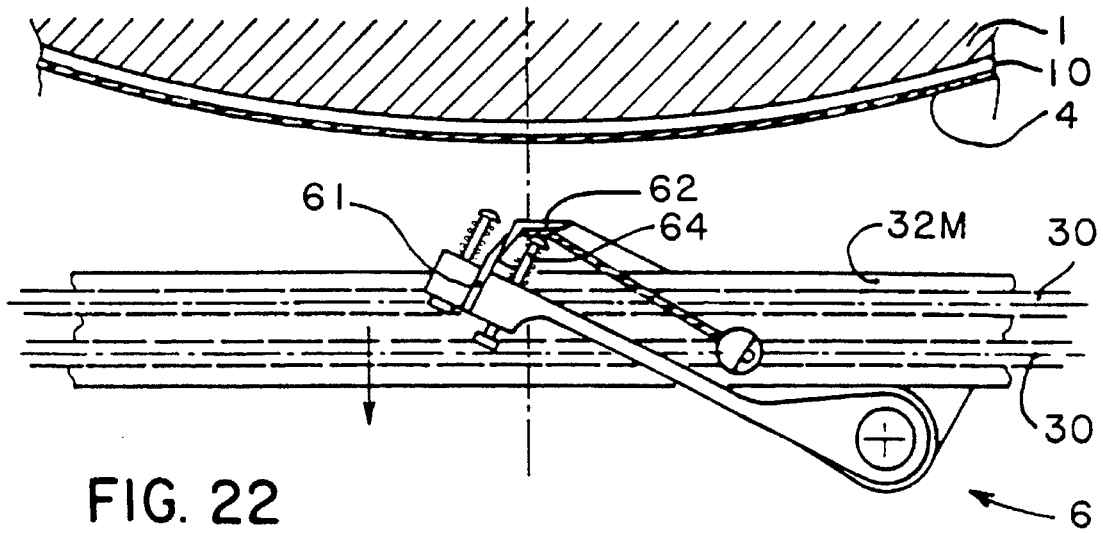
FIG. 22 illustrates the holding of the thread after manufacture during the evacuation of the support.

At the end of the manufacture of the reinforcement (FIG. 20), the eyelet 33 stops just after having gone beyond the central plane of the core 1, upon its passage from left to right. The part 6 rises, the knife 62 advances towards the core 1 (FIG. 21), which shears the thread 4 between the knife 61 and the counter-blade 62. The finger 63 applies the end of the thread 4 to the core; the finger 64 holds the thread 4 on the counter-blade 62. The apparatus can open, the chassis 51 slides on the rail 50, which completely frees the core 1 on which a reinforcement has just been manufactured (FIG. 22).

Upon the following start, the apparatus 3 is brought towards the following core 1 (FIG. 23) and then the movement of the eyelet 33 is started. As soon as the latter has moved around the core, the starting end of the thread 4 is adhered on the core 1 which has been precoated with rubber.

The method of manufacturing a radial carcass can be carried out in accordance with different variants in order to produce one carcass ply or several. One can produce a carcass ply in several laying passes (n), each pass covering 360° around the circumference of the entire core; the radial hoops of each pass being laid in accordance with a pitch P, generally expressed in radians, the position on the core 1 of the threads 4 laid during two successive passes then has a circumferential offset corresponding to P/n. The person skilled in the art can very easily note various ways of using the invention, depending on the architecture of the tire which he desires to obtain.

The scope of the invention is not limited to the different mechanical parts of the machine described. The person skilled in the art can very easily substitute equivalents, such as, for instance, a different cocking and release system, or a suitably curved split rail instead of pulleys in order to form the guide circuit.

We claim:

1. A method of manufacturing a rubber tire in which a reinforcement thread is applied on a support, the surface of which is a building reference for the inner surface of the tire, the reinforcement thread applied on the support being held on the support by adherence, comprising laying the reinforcement thread on the support by displacing a guide means in the space over the trace which the thread will have after it has been wound on the support, said guide means being in guiding relationship with slippage on the thread, the laying of the reinforcement thread being carried out by imparting to said guide means a movement permitting the winding of the thread on the support from one side to the other of the support and then winding back so that the thread forms adjacent hoops on the support, maintaining the reinforcement thread on the support as the reinforcement thread is deposited thereon by adherence, continuation of the movement with, from one winding to the next, relative circumferential displacement between the support and guide means by an amount corresponding to the laying pitch of the thread on the support, pressing with pressing means the thread against the support at each edge of a hoop during the side-to-side movements to adhere the thread to the support, said pressing taking place during the movement of the guide means after each change in direction of the guide means, and relieving the pressing of the thread against the support before the return of the guide means with thread to be pressed against the support after the relative circumferential displacement.

2. A method according to claim 1, characterized by the fact that the reinforcement thread laid is the carcass thread forming radial hoops on the support, and by the fact that the guide means carries out a reciprocating movement between the regions corresponding to each bead of the tire.

3. A method according to claim 2, characterized by the fact that the method comprises n carcass-thread laying passes around the circumference of the support, each pass covering 360° around the circumference of the entire support.

4. A method according to claim 3, characterized by the fact that the radial hoops on a pass are laid according to a pitch P and on two successive passes the threads are laid with a circumferential offset corresponding to P/n.

5. A method according to claim 1, characterized by the fact that the laying pitch of the thread is variable.

6. A method according to claim 5, characterized by the fact that the variation of the pitch is sinusoidal.

7. A method of manufacturing a rubber tire in which different components, including an adhesive coating and a reinforcement thread, are applied at the place required by the architecture of the tire on a support the surface of which is a building reference for the inner surface of the tire, the reinforcement thread applied on the support being held on the support by adherence, said method comprising laying the reinforcement thread transversely back and forth across the support by displacing a guide means in the space over the trace which the thread will have after it has been wound on the support, the guide means being in guiding relationship with slippage on the thread, the laying of the reinforcement thread being carried out by imparting to said guide means a movement which causes it to move continuously in a closed loop with a first portion of the closed loop being from one side to the other side of the support and a second portion of the closed loop being from said other side back to said one side, the guide means moving in said closed loop across the support in one direction and then reversing direction and returning across the support in the opposite direction the first portion of the closed loop being superposed relative to the second portion, and in which, due to the fact that the thread remains applied to the support by adherence on said coating, the movement of the guide means back and forth across the support assures the feeding of the thread from a source making it possible to feed the reinforcement thread upon demand and maintaining the reinforcement thread on the support by adherence all along its length as the reinforcement thread is deposited thereon, the support moving circumferentially with respect to the guide means, between a movement of the guide means and the next opposite movement by an amount corresponding to the laying pitch of the thread.

8. A method of manufacturing a rubber tire in which different components, including a reinforcement thread, are applied at the place required by the architecture of the tire on a support the surface of which is a building reference for the inner surface of the tire, said method including applying the reinforcement thread on the support to form contiguous hoops in the following manner:

laying the thread by applying it by adherence on the support at a starting point corresponding to the edge of a hoop, continuously displacing a guide means in guiding relationship with slippage on the thread over the support along an arcuate trajectory from the starting point to a point of arrival corresponding to the other edge of the same hoop, maintaining the placement of the thread on the support all along its length by adherence to the support, pushing and holding with pushing action the thread against the support at the arrival point to cause the thread to adhere to the support while the guide means continues its movement relative to the support and then relieving the pushing action when the thread is adhered to the support, repeating the above operations alternately from left to right and then from right to left over the support, displacing the support with respect to the guide means by an amount corresponding to the laying pitch between two alternate displacements of said guide means.

* * * * *